(12) United States Patent
Koivisto et al.

(10) Patent No.: US 8,665,692 B2
(45) Date of Patent: Mar. 4, 2014

(54) METHOD AND APPARATUS PROVIDING INTERFERENCE MEASUREMENT IN A COORDINATED MULTI-POINT TRANSMISSION ENVIRONMENT

(75) Inventors: Tommi T. Koivisto, Espoo (FI); Mihai Enescu, Espoo (FI); Timo E. Roman, Espoo (FI); Timo E. Lunttila, Espoo (FI)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 12/928,704

(22) Filed: Dec. 16, 2010

(65) Prior Publication Data

US 2012/0155291 A1    Jun. 21, 2012

(51) Int. Cl.
*H04J 9/00*    (2006.01)

(52) U.S. Cl.
USPC ............................................ 370/204; 370/328

(58) Field of Classification Search
None
See application file for complete search history.

(56) References Cited

U.S. PATENT DOCUMENTS

| | | | |
|---|---|---|---|
| 2011/0243009 A1* | 10/2011 | Chandrasekhar et al. | 370/252 |
| 2011/0261673 A1* | 10/2011 | Luo et al. | 370/201 |
| 2012/0120891 A1* | 5/2012 | Mazzarese et al. | 370/329 |
| 2012/0220327 A1* | 8/2012 | Lee et al. | 455/509 |
| 2013/0208678 A1* | 8/2013 | Zhang | 370/329 |

FOREIGN PATENT DOCUMENTS

WO    WO-2009/113951 A1    9/2009

OTHER PUBLICATIONS

"Precoded RS for link adaptation; performance gains in CSG deployments", Qualcomm Europe, 3GPP TSG-RAN WG1 #bis, R1-094219, Oct. 2009, 7 pgs.
R1-102420; Intercell muting for CSI-RS; TSG-RAN WG1 Meeting #60bis; Apr. 12-16, 2010 (4 pages).
R1-102698; Muting aspects and Intercell CSI-RS design; TSG RAN WG1 Meeting #61, May 10-14, 2010 (6 pages).
R1-105164; Interference Measurement over Muted RE; 3GPP TSG RAN WG1 Meeting #62bis, China 11-15, 2010 (4 pages).
TS 36.213 V9.3.0 (Sep. 2010) 3rd Generation Partnership Project; Technical Specification Group Radio Access Network; Evolved Universal Terrestrial Radio Access (E-UTRA); Physical layer procedures (Release 9) (18 pages).

* cited by examiner

*Primary Examiner* — Donald Mills
(74) *Attorney, Agent, or Firm* — Harrington & Smith

(57) ABSTRACT

A method includes receiving signaling from a base station, where the signaling includes information descriptive of a muted resource element pattern configuration when operating in a cell that is associated with at least one multi-cell cooperation area. The method further includes making at least one measurement according to the received information for at least one of the cooperation areas for making an interference estimate and transmitting measurement results to the base station. Another method includes transmitting signaling that contains information descriptive of a muted resource element pattern configuration to a user equipment operating in a cell that is associated with at least one multi-cell cooperation area. This method further includes muting resource element transmissions in accordance with the information descriptive of the muted resource element pattern configuration; and receiving from the user equipment at least one measurement made according to the transmitted signaling for at least one of the cooperation areas. In these methods different cooperation areas are associated with mutually orthogonal muted resource elements. Corresponding apparatus and computer programs stored on non-transitory computer readable medium are also disclosed.

17 Claims, 5 Drawing Sheets

METHOD AND APPARATUS PROVIDING INTERFERENCE MEASUREMENT IN A COORDINATED MULTI-POINT TRANSMISSION ENVIRONMENT

TECHNICAL FIELD

The exemplary and non-limiting embodiments of this invention relate generally to wireless communication systems, methods, devices and computer programs and, more specifically, relate to techniques to make interference measurements.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BS base station
BW bandwidth
CA cooperation area
CoMP coordinated multi-point transmission
CQI channel quality indication
DL downlink (eNB towards UE)
DTX discontinuous transmission
eNB E-UTRAN Node B (evolved Node B)
EPC evolved packet core
E-UTRAN evolved UTRAN (LTE)
IMTA international mobile telecommunications association
ITU-R international telecommunication union-radiocommunication sector
LTE long term evolution of UTRAN (E-UTRAN)
LTE-A LTE-Advanced
MAC medium access control (layer 2, L2)
MM/MME mobility management/mobility management entity
NodeB base station
OFDMA orthogonal frequency division multiple access
O&M operations and maintenance
PDCP packet data convergence protocol
PDSCH physical downlink shared channel
PHY physical (layer 1, L1)
PMI precoding matrix indicator
PRB physical resource block
RE resource element
Rel release
RLC radio link control
RRC radio resource control
RRM radio resource management
RS reference signal
RSRP reference signal received power
SGW serving gateway
SC-FDMA single carrier, frequency division multiple access
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009 December), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1 reproduces FIG. 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913 V9.0.0 (2009-12) Technical Report 3rd Generation Partnership Project; Technical Specification Group Radio Access Network; Requirements for further advancements for Evolved Universal Terrestrial Radio Access (E-UTRA) (LTE-Advanced) (Release 9). Reference can also be made to 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100

MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

As an LTE-Advanced Study Item a so-called coordinated multi-point transmission (CoMP) has been introduced. In DL CoMP the transmissions from multiple cells are coordinated such as to mitigate inter-cell interference among the cells at the UE. This type of operation requires channel state information (CSI) feedback from the UE to the eNB. The CSI feedback could take the form of, for example, a precoding matrix indication (PMI) or other form of CSI that allows weighting the eNB antennas in order to mitigate interference in the spatial domain.

Typically the UE also needs to feedback channel quality indications (CQI) to allow proper link adaptation at the eNB, preferably taking into account the inter-cell coordination to reflect correct interference level after coordination. The CQI calculation at the UE requires not only estimating the downlink channels associated with the cooperating cells, which relates to the associated CSI (e.g. PMI), but also the interference level outside of the set of cooperating cells.

SUMMARY

The foregoing and other problems are overcome, and other advantages are realized, by the use of the exemplary embodiments of this invention.

In a first aspect thereof the exemplary embodiments of this invention provide a method that comprises receiving signaling from a base station comprising information descriptive of a muted resource element pattern configuration when operating in a cell that is associated with at least one multi-cell cooperation area; making at least one measurement according to the received information for the at least one multi-cell cooperation area for making an interference estimate; and transmitting measurement results to the base station.

In another aspect thereof the exemplary embodiments of this invention provide a method that comprises transmitting signaling comprising information descriptive of a muted resource element pattern configuration to a user equipment operating in a cell that is associated with at least one multi-cell cooperation area; muting resource element transmissions in accordance with the information descriptive of the muted resource element pattern configuration; and receiving from the user equipment at least one measurement made according to the transmitted signaling for the at least one multi-cell cooperation area.

In a further aspect thereof the exemplary embodiments of this invention provide an apparatus that comprises a processor and a memory including computer program code. The memory and computer program code are configured, with the processor, so as to cause the apparatus at least to, when operating in a cell that is associated with at least one multi-cell cooperation area, receive signaling from a base station comprising information descriptive of a muted resource element pattern configuration; to make at least one measurement according to the received information for the at least one multi-cell cooperation area so as to make an interference estimate; and to transmit measurement results to the base station.

In yet another aspect thereof the exemplary embodiments of this invention provide an apparatus that comprises a processor and a memory including computer program code. The memory and computer program code are configured, with the processor, so as to cause the apparatus at least to transmit signaling comprising information descriptive of a muted resource element pattern configuration to a user equipment operating in a cell that is associated with at least one multi-cell cooperation area; to mute resource element transmissions in accordance with the information descriptive of the muted resource element pattern configuration; and to receive from the user equipment at least one measurement made according to the transmitted signaling for the at least one multi-cell cooperation area.

In yet another aspect thereof the exemplary embodiments of this invention provide a computer program product comprising a computer-readable medium bearing computer program code embodied therein for use with a computer. The computer program code comprises code for receiving signaling from a base station comprising information descriptive of a muted resource element pattern configuration when operating in a cell that is associated with at least one multi-cell cooperation area; code for making at least one measurement according to the received information for the at least one cooperation area for making an interference measurement; and code for transmitting measurement results to the base station.

In yet another aspect thereof the exemplary embodiments of this invention provide a computer program product comprising a computer-readable medium bearing computer program code embodied therein for use with a computer. The computer program code comprises code for transmitting signaling comprising information descriptive of a muted resource element pattern configuration to a user equipment operating in a cell that is associated with at least one multi-cell cooperation area; code for muting resource element transmissions in accordance with the information descriptive of the muted resource element pattern configuration; and code for receiving from the user equipment at least one measurement made according to the transmitted signaling for the at least one multi-cell cooperation area.

In a still further aspect thereof the exemplary embodiments of this invention provide an apparatus that comprises means for receiving signaling from a base station comprising information descriptive of a muted resource element pattern configuration when operating in a cell that is associated with a plurality of different multi-cell cooperation areas, where different cooperation areas are associated with mutually orthogonal muted resource elements; means for making at least one measurement according to the received information for at least one of the cooperation areas for making an interference estimate; and means for transmitting measurement results to the base station.

In yet another aspect thereof the exemplary embodiments of this invention provide an apparatus that comprises means for transmitting signaling comprising information descriptive of a muted resource element pattern configuration to a user equipment operating in a cell that is associated with a plurality of different multi-cell cooperation areas, where different cooperation areas are associated with mutually orthogonal muted resource elements; means for muting resource element transmissions in accordance with the information descriptive of the muted resource element pattern configuration; and means for receiving from the user equipment at least one measurement made according to the transmitted signaling for at least one of the cooperation areas.

DETAILED DESCRIPTION

Figure 1:
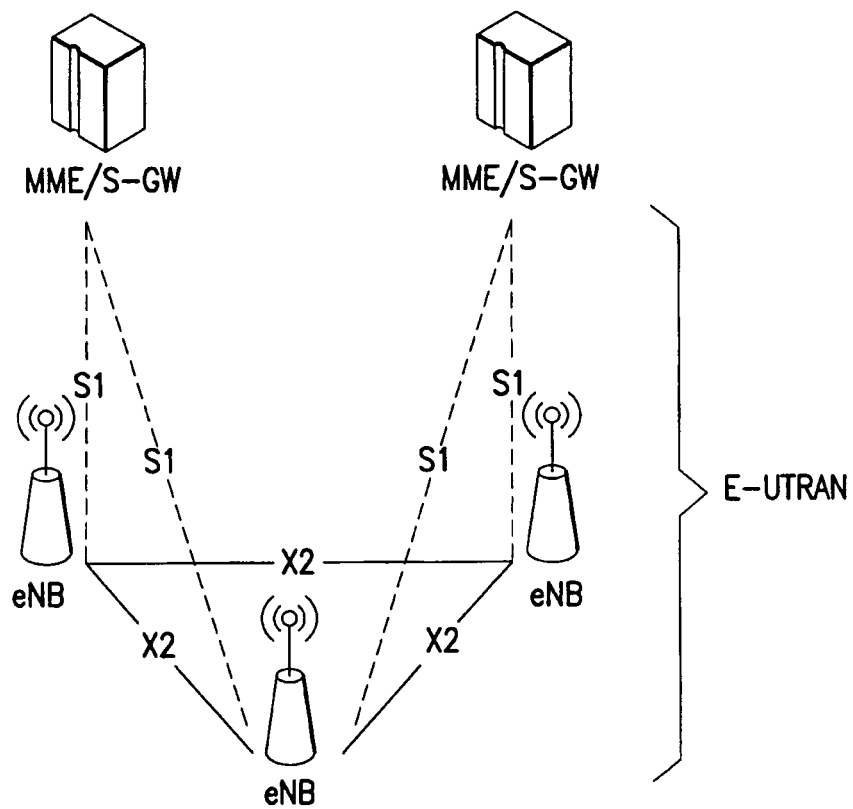
FIG. 1 reproduces FIG. 4.1 of 3GPP TS 36.300, and shows the overall architecture of the EUTRAN system.

The exemplary embodiments of this invention relate to making enhanced interference measurements for CoMP.

By way of introduction, the current assumption is that reference signals (RS) intended for CSI/CQI estimation are transmitted in each cell in the set of cooperating cells (a 'CoMP measurement set' in 3GPP terminology). In LTE these reference signals would be either the common reference signals (CRS) or CSI reference signals (CSI-RS). This approach would allow estimation of the CSI at the UE, i.e., estimating at the UE the spatial characteristics of the radio channel from each cell within the set of coordinated cells. However, the interference measurement needed for the CQI calculation at the UE is not as straightforward.

The interference measurement is typically performed in such a manner that first the channel is estimated from an associated RS, then an estimate of the corresponding signal, i.e., estimated channel convolved with the associated RS, is regenerated and subtracted from the received signal. The interference power (or covariance) underlying the RS (i.e., over the same resource as occupied by the RS) is then estimated. Time-frequency averaging/filtering may then be performed to obtain the final interference power (or covariance) estimate. While there are other techniques to perform this estimation, in basically all practical approaches it is the interference power underlying a known signal such as the RS that is estimated. For RS-based interference estimation to operate as desired the interference underlying the RS should reflect as closely as possible the interference level experienced during actual DL data transmission (e.g., over PDSCH).

To achieve a best possible CSI estimation the reference signals from different cells can be made orthogonal. This implies, for example, that the resource elements (RE) used for the RS in the serving cell are muted (i.e., nulled/blanked/DTXed/not transmitted) in several neighboring cells. In this case the interference estimated over the serving cell RS would correspond to the interference outside the set of cells that transmit the orthogonal RS. Since this set could be very different from the set of cooperating cells, the interference estimation would not provide accurate information about the exact post-coordination interference. On the other hand if RS orthogonalization between cells is not used, then the estimated interference will correspond to the interference caused by a single-cell transmission, i.e., it would not take into account the coordination. Thus, the use of this approach would not provide correct post-coordination interference estimation.

By 'single cell transmission' what is implied is a case where the UE receives the PDSCH from a single cell at any given time. However, in CoMP, multiple cells will typically simultaneously transmit PDSCH to different UEs, or at least coordinate their transmissions such as to minimize the inter-cell interference experienced at the UE side.

With the PDSCH RE muting approach to interference estimation similar problems can appear: The interference measured from the muted RE positions should reflect the exact post-coordination interference level in order to be useful. However, using conventional methods the interference would reflect only the total interference corresponding to single-cell transmission.

What further complicates these problems is the fact that the sets of cooperating cells are optimally selected to be UE-specific, i.e., the cooperating cells as well as the remaining post-coordination interference both depend on the location of the UE, or more specifically, typically depend on the received power levels at the UE corresponding to different cells. As a result there may be multiple different possibilities as to what type of interference the reported CQI should reflect, as each possible set of cooperating cells (or cooperation areas) implies a different level of interference. Since the cooperation areas are optimally UE-specific, it can be extremely difficult (if not impossible in a practical sense) to define common reference signals that would allow accurate interference estimation.

It is noted that the cooperation areas could also be network-specific (i.e., the network predefines sets of cells that cooperate with one another), but this approach is known to cause a performance loss as the cooperating cells will not be optimally selected.

A problem that is addressed and solved by the exemplary embodiments of this invention is how to enable an accurate interference estimation to be made in the presence of different cooperation areas.

In 3GPP TSG-RAN WG1 #58bis, R1-094219, 12-16 Oct. 2009, Miyazaki, Japan, Source: Qualcomm Europe, Title: Precoded RS for link adaptation: performance gains in CSG deployments, it was proposed to pre-schedule UEs according to some preliminary received feedback and transmit additional precoded reference signals for improved CQI measurement. This approach would possibly address the issue since the interference underlying the precoded reference signals is the post-coordination interference in case of CoMP. However, the use of this approach would have several drawbacks. For example, the scheduling would need to be constrained to the pre-scheduling decisions since there is no proper feedback available otherwise. Also, the use of this approach would introduce an additional cycle in the UE-eNB feedback loop. Since this would introduce additional delay the use of this approach might only be suitable for very static radio environments such as those experienced with home eNBs and indoor environments in general. Otherwise the frequency domain scheduling decision used to schedule CQI-RS (i.e., PRB allocation) would likely be outdated by the time the PDSCH data is transmitted, thereby negating or reducing any potential gain. Furthermore, the precoded RS needs to be UE-specific, as opposed to common for a population of UEs, which would increase the signaling overhead dramatically. Furthermore, this type of approach is sub-optimal in the sense that it decouples scheduling decisions from link adaptation. However, it can be shown that optimal performance is only achieved when scheduling decisions and link adaptation are jointly performed at the eNB.

A general approach to muting resource elements for interference measurement purposes was presented in WO09113951A, Neighbour Cell Quality Measurement in a Telecommunications System. However, this document is concerned with the single cell case, and this alone does not address or solve the issue of interference measurement within the framework of CoMP, i.e., it does not address the problems that arise in the multi-cell case with different cooperation areas.

Figure 2:
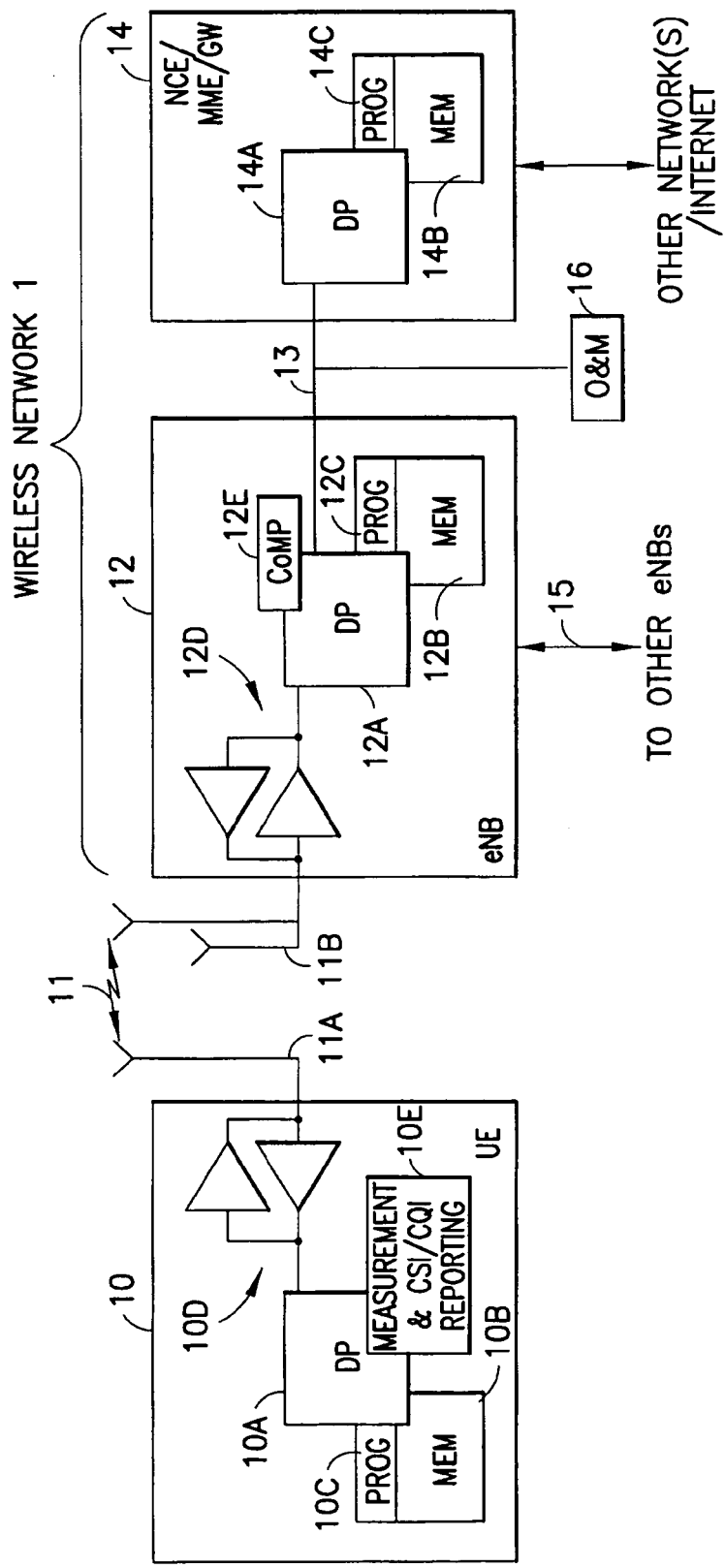
FIG. 2 shows a simplified block diagram of various electronic devices that are suitable for use in practicing the exemplary embodiments of this invention.
Figure 3:
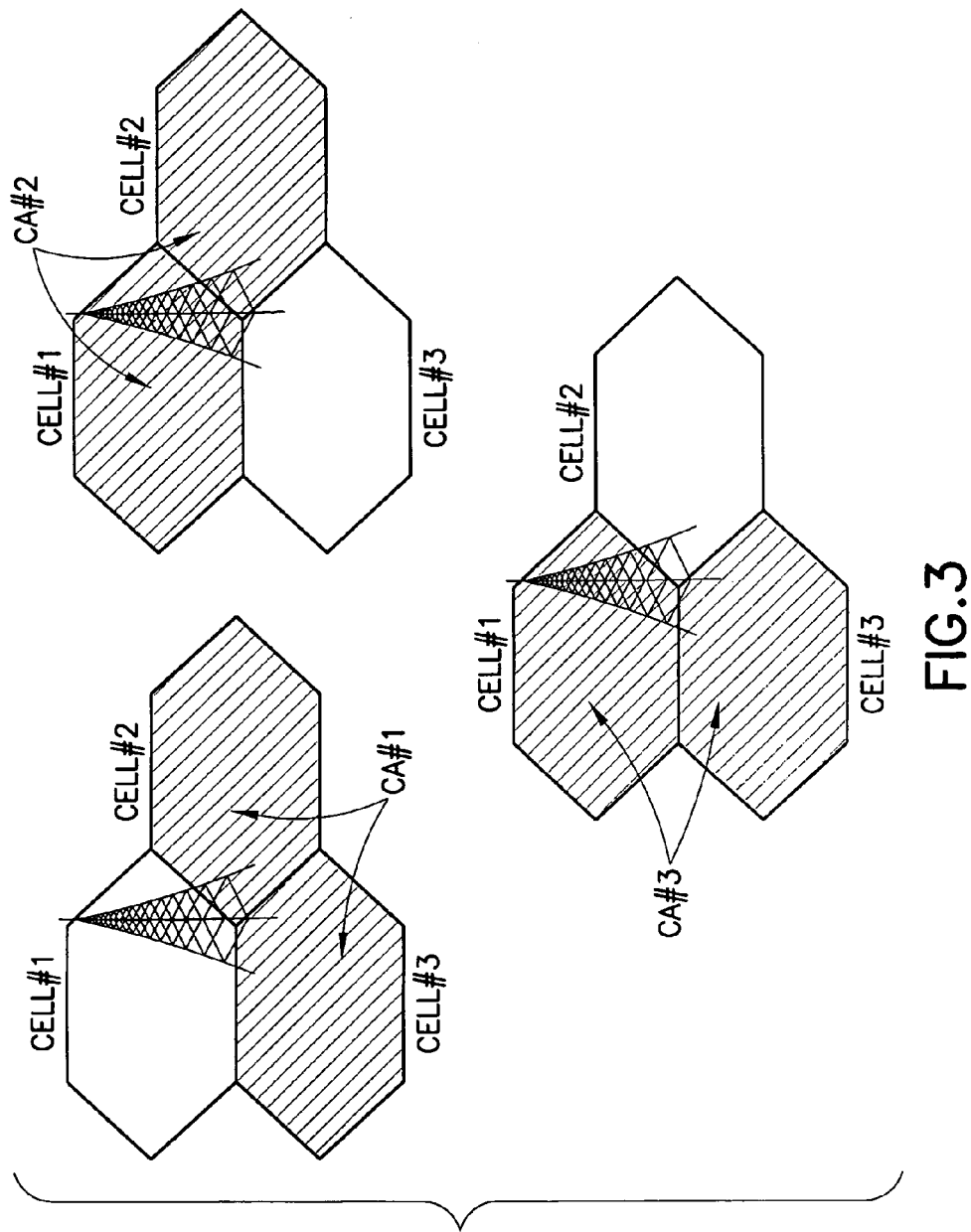
FIG. 3 presents a simple example of cooperation areas within a 3-sector site.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1, and which provides connectivity with a further network, such as a telephone network and/or a data communications network (e.g., the Internet). The network 1 can also include a network element such as one that implements an O&M function 16. The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas 11A. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several) 11B. The eNB antenna(s) 11B can be implemented, for example, as a multi-sector antenna system that establishes a plurality of cells (e.g., such as is shown in FIG. 3 and described in detail below). More generally the eNB 12 (base station) can control one cell or it can control multiple cells by any suitable technology, including the use of remote radio heads (for example). The eNB 12 is coupled via a data/control path 13 to the NCE 14. The path 13 may be implemented as the S1 interface shown in FIG. 1. The eNB 12 can be assumed to be coupled to other eNBs via data/control path 15, which may be implemented as the X2 interface shown in FIG. 1. Signaling between eNBs 12 can be achieved via the X2 interface.

For the purposes of describing the exemplary embodiments of this invention the UE 10 can be assumed to also include a measurement and CSI/CQI reporting function/module 10E, and the eNB 12 includes a CoMP function or module 12E, as well as scheduling and link adaptation functions and modules that operate on CoMP-related feedback received from the UE 10.

The PROGs 10C and 12C include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with the exemplary embodiments of this invention there is established a pre-defined set of possible cooperation areas per cell, and a definition of a muted RE pattern for each cooperation area in such a manner that the muted REs are not overlapping between different cooperation areas. In other words, the different cooperation areas are associated with mutually orthogonal muted RE patterns. Further in accordance with the exemplary embodiments of this invention there is also established a provision for signaling between eNBs 12 (such as via the X2 interface 15 shown in FIGS. 1 and 2) to coordinate the usage of muted RE patterns for different cooperation areas, as well as signaling from the eNB 12 to the UE 10 to indicate which muted RE pattern the UE can utilize for making the interference measurement.

It can be noted that the use of inter-eNB signaling, such as via the X2 interface, can be particularly useful in a network deployment where the cooperation areas are configured at a local level (e.g., the cooperation areas are self-configured between neighboring eNBs 12) as opposed to being globally configured (e.g., such as by the O&M 16). However, it should be further noted that the use of the exemplary embodiments of this invention applies to both cases equally, i.e., to the muted RE patterns being configured by the O&M 16, and to the muted RE patterns being configured in a coordinated manner by signaling exchanged between the eNBs 12, for example via the X2 interface 15. Of course, if the muted RE patterns are configured locally in a coordinated manner by the eNBs 12 this does not rule out the O&M 16 (or some other network function) having an ability to influence to some degree the coordination decisions made by the eNBs 12.

In any case, there is provided a reuse pattern for the muted REs according to defined cooperation areas, where the muted RE patterns are coordinated amongst the cells to enable a proper interference estimation to occur.

The eNB 12 mutes (e.g., DTX) its transmission on certain REs according to the pre-defined patterns associated with the cooperation areas that the eNB 12 is engaged in at a particular time instance. Further, the eNB 12 signals to the UE 10 which pattern the UE 10 should use to support the interference estimation, i.e., the eNB 12 signals to the UE 10 at least one muted RE pattern that it should measure. This can be accomplished, for example, when the eNB 12 initially configures the UE 10 to report CoMP feedback. The muted RE pattern is one that is linked to or otherwise associated with the cooperation area assigned to the UE 10.

The UE 10 receives the muted RE pattern configuration from the eNB 12. When reporting CQI to the eNB 12 the measurement function 10E operates to measure interference according to the muted RE pattern and the given cooperation area. The UE 10 may also be instructed to report multiple CQIs corresponding to multiple cooperation areas, or it may be instructed to report, for example, the cooperation area that optimizes some performance measure, and provide the related CQI.

The use of a synchronous network is an underlying assumption with CoMP, as CoMP can be difficult or impossible to achieve in a reliable manner without the presence of network synchronization. This ensures that between the different cells certain REs are overlapping on the OFDM time-frequency grid as desired.

Consider a simple example of 3-sector site and intra-site CoMP within that site as depicted in FIG. 3. For the three cells associated with the three sectors there are three possible cooperation areas denoted by CA#1, CA#2 and CA#3, which could represent the pre-defined cooperation areas. Each cooperation area in this non-limiting example contains two cells, and each cell belongs in this non-limiting example to two cooperation areas (e.g., Cell#1 belongs to CA#2 and CA#3). Note that it would be possible also to form one cooperation area of three cells, but due to sectorization such cooperation is unlikely to occur in practice (or to provide any significant benefits at the system level). However, such a three (or more) cell cooperation area could also be readily supported by the exemplary embodiments of this invention. In a general case there may be one multi-cell cooperation area, and a given cell is part of only the one multi-cell cooperation area.

Figure 4:
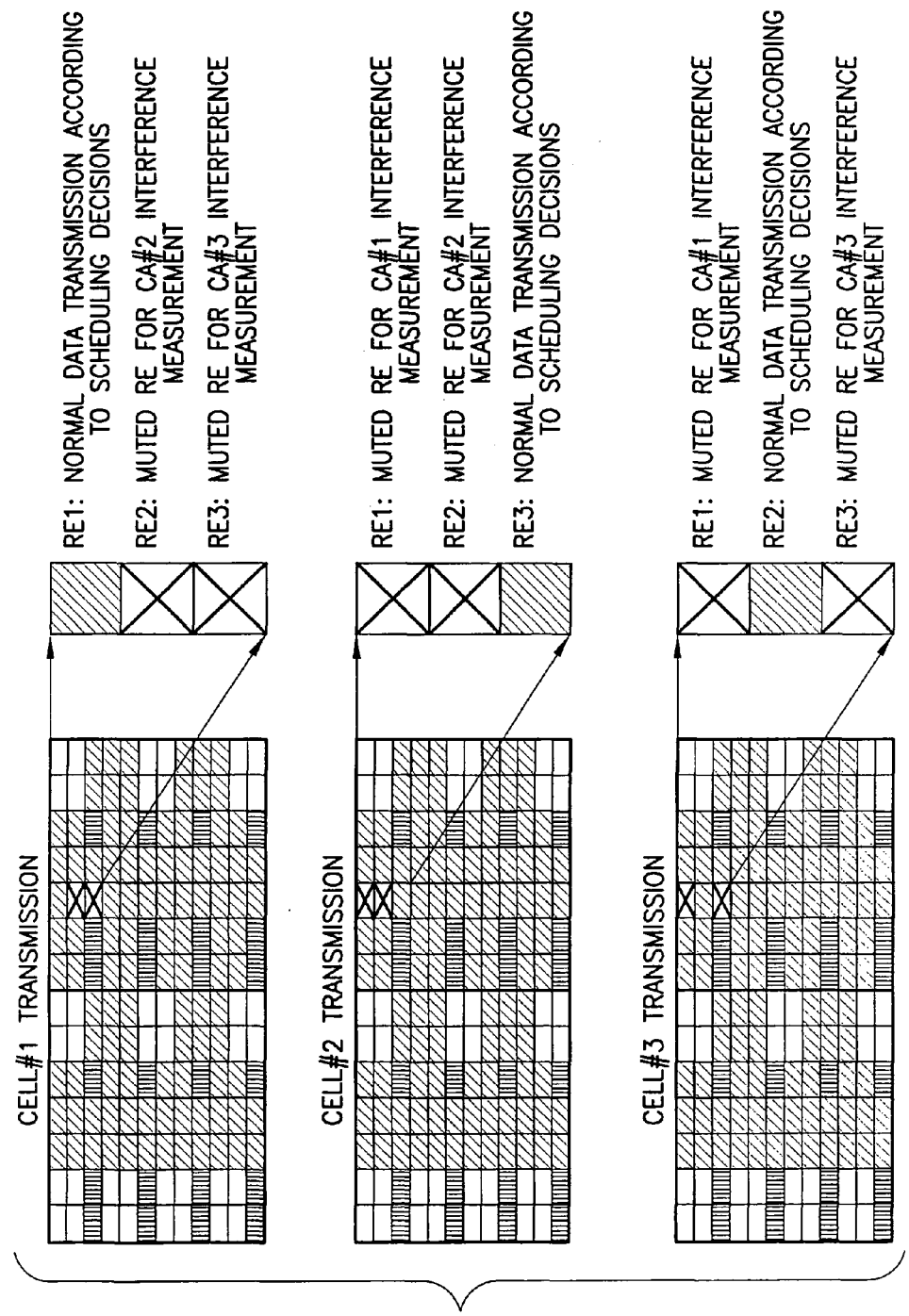
FIG. 4 shows an example of muted RE patterns within one PRB in the case of the example cooperation area deployment of FIG. 3.

FIG. 4 shows a time (x-axis) and frequency (y-axis) grid with corresponding exemplary muted RE patterns. For example, a UE 12 within the coverage area of Cell#1 configured to report feedback for CA#2 would measure the interference from RE2. Cell#2 also belongs to this cooperation area, hence it has muted its transmission in the same RE2. On the other hand Cell#3 does not belong to the CA, and thus is transmitting data normally in this RE2 in order to correctly reflect the interference situation with respect to CA#2 and other potential CAs. It is noted that any other cells not shown in FIG. 3 can also be transmitting PDSCH data normally in all of the REs RE1-RE3 to ensure the measurement of a correct interference level. Other CAs outside of this set of three cells have their muted REs orthogonal, i.e. time-frequency shifted (different subframes, subcarriers and/or OFDM symbols) as compared to the muted REs in FIG. 4. In other words, the other possible cooperation areas preferably have their corresponding muted REs non-overlapping with those shown in the figure.

It should be appreciated that all cells belonging to a certain cooperation area mute the same set of REs, while in other cells these REs are used for normal (e.g., PDSCH) transmission. The application of this rule ensures that the muted REs reflect/see a correct interference level, i.e., the one that will be experienced by the UE 10 during a PDSCH transmission.

An aspect of the exemplary embodiments of this invention is to configure the network with predefined cooperation areas and associated muted RE patterns. This can be accomplished, for example as mentioned above, via the O&M 16 functionality shown in FIG. 2. Note that this network configuration function can be one physically separate from the eNB(s) 12 (as shown in FIG. 2), or it can be one that is logically separate while being physically co-located with one of the eNBs 12 (or some other network entity). The muted RE patterns associated with any two different cooperation areas are defined by mutually orthogonal resources. The eNB 12 transmits the given muted RE patterns according to the configured CAs in selected subframes. The selected subframes may be, for example, periodically arranged, e.g., every 2, 5, 10 or 20 ms.

Note in this regard that what is implied by an eNB 12 that "transmits" a muted RE can simply be that no actual transmission occurs at all in the portion of the frequency spectrum (subcarrier) associated with the muted RE during the time period associated with the muted RE.

When configuring the UE 10 to report feedback for a given CA (or for multiple CAs) the eNB 12 also signals the associated muted REs to the UE 10. For example, each CA could be linked to a cooperation area identifier (ID) which is linked to a certain RE pattern (e.g. time/frequency/subframe shift). In such a case the UE 10 is informed of the IDs of the CAs to be measured, and the UE 10 converts the ID (such as by a table lookup procedure) to a corresponding RE pattern. Selecting the CA(s) for each UE could be done, for example, based on received RSRP reports.

In this context what is meant by a "shift" is that the muted REs are located in some certain OFDM symbol (time), subcarrier (frequency) and certain subframe. Then, by example, there could be a shift 0 in frequency meaning the first subcarrier of the PRB, a shift 1 in the second subcarrier, and so forth. Similarly for OFDM symbols and subframes, and by example, placing the muted REs in subframe 1 would imply a shift of one subframe. The term "shift" in this context is what is commonly used in 3GPP to describe that REs are allocated in different OFDM symbols/subcarriers/subframes.

The UE 10 measures via measurement unit 10E the interference based on the received CA and the RE pattern configuration. This can be accomplished by measuring the average power level within the muted resource elements. The measurement could be performed as a wideband measurement over a plurality of subbands, or it could be performed as separate measurements per each subband of M PRBs, where M is an integer number of PRBs. For each reported subband the UE 10 can, for example, report the CQI according to each (at least one) configured CA, or the UE 10 can report only the CQI for the CA that optimizes some performance measure, such as the CA that provides the highest (data) throughput. It may be most preferable that the UE 10 is configured to report exactly one CA. The reporting format to be used can be specified by the eNB 12.

It should be appreciated that one technical effect and advantage that is realized by the use of the exemplary embodiments of this invention is providing an ability to make an accurate interference estimation for different cooperation areas, while still allowing a large degree of freedom in selecting the cooperation areas in a UE-specific manner, whereby the UE 10 is enabled to report accurate CQI information corresponding exactly to the cooperation area selected for the UE 10.

Another technical effect and advantage that is realized by the use of the exemplary embodiments of this invention, as compared to the usage of RS for interference estimation, is that an additional channel estimation operation prior to interference estimation is not needed, thereby avoiding introducing additional bias to the interference estimates.

Note that PDSCH power boosting may be used in some embodiments to take advantage of the power not used by the muted REs. Note in this regard that when some REs are muted there is some corresponding DL BW reduction. However, since the total power that the eNB 12 can use remains the same the "left-over" power can be used to improve the PDSCH transmission by transmitting the PDSCH at, enhanced (boosted) power.

Based on the foregoing it should be apparent that the exemplary embodiments of this invention provide a method, apparatus and computer program(s) to enhance CoMP operation of a wireless communications network. In one sense the exemplary embodiments may be considered as providing ability for a system to measure interference in CoMP by the use of PDSCH "holes".

Figure 5:
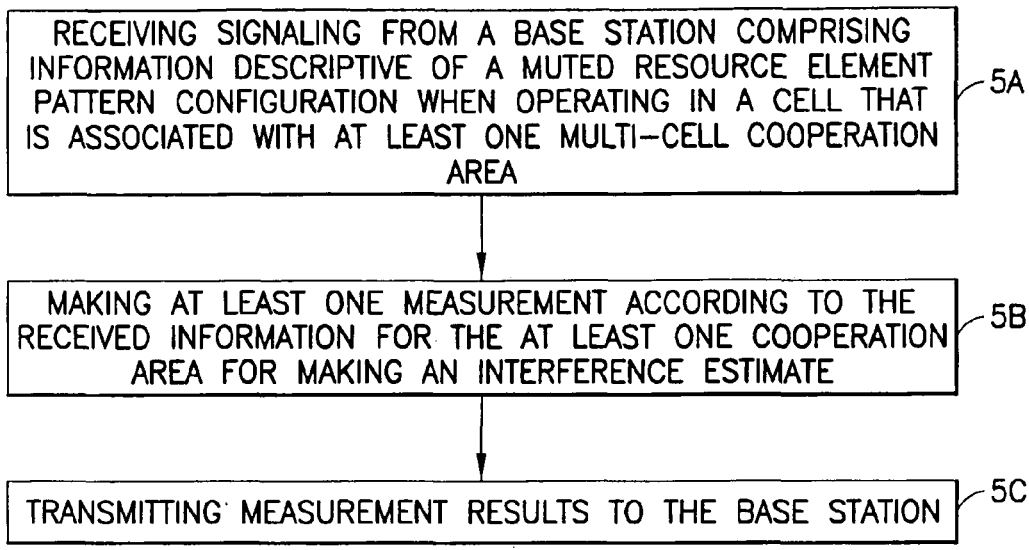
FIG. 5 is a logic flow diagram that illustrates the operation of a method, and a result of execution of computer program instructions embodied on a computer readable medium, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of receiving signaling from a base station comprising information descriptive of a muted resource element pattern configuration when operating in a cell that is associated with at least one multi-cell cooperation area. At Block 5B there is a step of making at least one measurement according to the received information for the at least one multi-cell cooperation area for making an interference estimate. At Block 5C there is a step of transmitting measurement results to the base station.

Figure 6:
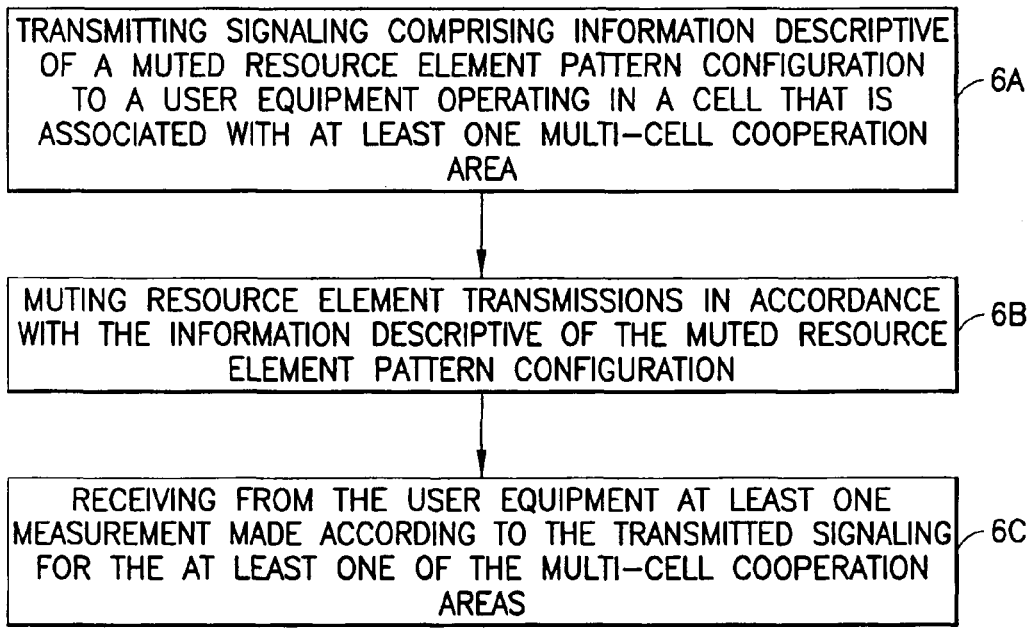
FIG. 6 is a logic flow diagram that illustrates the operation of a method, and a result of execution of computer program instructions embodied on a computer readable medium, further in accordance with the exemplary embodiments of this invention.

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step of transmitting signaling comprising information descriptive of a muted resource element pattern configuration to a user equipment operating in a cell that is associated with at least one multi-cell cooperation area. At Block 6B there is a step of muting resource element transmissions in accordance with the information descriptive of the muted resource element pattern configuration. At Block 6C there is a step of receiving from the user equipment at least one measurement made according to the transmitted signaling for the at least one multi-cell cooperation area.

The various blocks shown in FIGS. 5 and 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, in one exemplary embodiment of this invention there is provided an apparatus that comprises a processor and a memory including computer program code. The memory and computer program code are configured, with the processor, to cause the apparatus at least to, when operating in a cell that is associated with a plurality of different multi-cell cooperation areas, receive signaling from a base station comprising information descriptive of a muted resource element pattern configuration; to make at least one measurement according to the received information for at least one of the cooperation areas so as to make an interference estimate; and to transmit measurement results to the base station.

In another exemplary embodiment of this invention there is provided an apparatus that comprises a processor and a memory including computer program code. The memory and computer program code are configured, with the processor, to cause the apparatus at least to transmit signaling comprising information descriptive of a muted resource element pattern configuration to a user equipment operating in a cell that is associated with a plurality of different multi-cell cooperation areas; to mute resource element transmissions in accordance with the information descriptive of the muted resource element pattern configuration; and to receive from the user equipment at least one measurement made according to the transmitted signaling for at least one of the cooperation areas.

In a further exemplary embodiment of this invention there is provided an apparatus that comprises means for receiving signaling from a base station comprising information descriptive of a muted resource element pattern configuration when operating in a cell that is associated with a plurality of different multi-cell cooperation areas, where different cooperation areas are associated with mutually orthogonal muted resource elements; means for making at least one measurement according to the received information for at least one of the cooperation areas for making an interference estimate; and means for transmitting measurement results to the base station.

In a further exemplary embodiment of this invention there is provided an apparatus that comprises means for transmitting signaling comprising information descriptive of a muted resource element pattern configuration to a user equipment operating in a cell that is associated with a plurality of different multi-cell cooperation areas, where different cooperation areas are associated with mutually orthogonal muted resource elements; means for muting resource element transmissions in accordance with the information descriptive of the muted resource element pattern configuration; and means for receiving from the user equipment at least one measurement made according to the transmitted signaling for at least one of the cooperation areas.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN LTE-A system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and other functions (e.g., CQI, RE, PMI, CoMP, etc.) are not intended to be limiting in any respect, as these parameters and other functions may be identified by any suitable names. Further, any specific names assigned to channels (e.g., PDSCH) are not intended to be limiting in any respect, as a particular channel may be identified by any suitable name.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving signaling from a base station comprising information descriptive of a muted resource element pattern configuration when operating in a cell that is associated with at least one multi-cell cooperation area;
   making at least one measurement according to the received information for the at least one cooperation area for making an interference measurement; and
   transmitting measurement results to the base station, where different multi-cell cooperation areas are associated with mutually orthogonal muted resource elements.

2. An apparatus, comprising:
   a processor; and
   a memory including computer program code, where the memory and computer program code are configured, with the processor, so as to cause the apparatus at least to, when operating in a cell that is associated with at least one multi-cell cooperation area, receive signaling from a base station comprising information descriptive of a muted resource element pattern configuration; to make at least one measurement according to the received information for the at least one cooperation area so as to make an interference estimate; and to transmit measurement results to the base station, where different multi-cell cooperation areas are associated with mutually orthogonal muted resource elements.

3. The apparatus of claim 2, where the transmitted measurement results are for one multi-cell cooperation area or for a plurality of multi-cell cooperation areas.

4. The apparatus of claim 3, where the one multi-cell cooperation area is one that optimizes a performance measure.

5. The apparatus of claim 2, where the received information comprises a cooperation area identifier linked to a certain resource element pattern in at least one of time, frequency, and subframe shift.

6. The apparatus of claim 2, where when making the at least one measurement the memory and computer program code are further configured, with the processor, to measure an average power level within a muted resource element.

7. The apparatus of claim 2, where the measurement is made as one of a wideband measurement over a plurality of subbands of a plurality of physical resource blocks or as separate measurements per each subband of a plurality of physical resource blocks.

8. A method, comprising:
   transmitting signaling comprising information descriptive of a muted resource element pattern configuration to a user equipment operating in a cell that is associated with at least one multi-cell cooperation area;
   muting resource element transmissions in accordance with the information descriptive of the muted resource element pattern configuration; and
   receiving from the user equipment at least one measurement made according to the transmitted signaling for the at least one multi-cell cooperation area, where different multi-cell cooperation areas are associated with mutually orthogonal muted resource elements.

9. An apparatus, comprising:
   a processor; and
   a memory including computer program code, where the memory and computer program code are configured, with the processor, so as to cause the apparatus at least to transmit signaling comprising information descriptive of a muted resource element pattern configuration to a user equipment operating in a cell that is associated with at least one multi-cell cooperation area; to mute resource element transmissions in accordance with the information descriptive of the muted resource element pattern configuration; and to receive from the user equipment at least one measurement made according to the transmitted signaling for the at least one multi-cell cooperation area, where different multi-cell cooperation areas are associated with mutually orthogonal muted resource elements.

10. The apparatus of claim 9, where the received measurement results are for one multi-cell cooperation area, or for a plurality of multi-cell cooperation areas.

11. The apparatus of claim 10, where the one multi-cell cooperation area is one that optimizes a performance measure.

12. The apparatus of claim 9, where the information in the transmitted signaling comprises a cooperation area identifier linked to a certain resource element pattern in at least one of time, frequency and subframe shift.

13. The apparatus of claim 9, embodied as a base station of a wireless communications network, where the base station establishes a plurality of cells that comprise a plurality of different multi-cell cooperation areas, and where the base station and other base stations of the wireless communications network are configured with information descriptive of predefined cooperation areas and associated muted resource element patterns.

14. The apparatus of claim 13, where the memory and computer program code are further configured, with the processor, to send signaling between the base station and the other base stations to coordinate usage of the resource element patterns for different multi-cell cooperation areas.

15. The apparatus of claim 9, where the muted resource elements correspond to physical downlink shared channel transmissions.

16. A computer program product comprising a non-transitory computer-readable medium bearing computer program code embodied therein, where execution of the computer program code by at least one data processor results in performing operations comprising:
- receiving signaling from a base station comprising information descriptive of a muted resource element pattern configuration when operating in a cell that is associated with at least one multi-cell cooperation area;
- making at least one measurement according to the received information for the at least one cooperation area for making an interference measurement; and
- transmitting measurement results to the base station, where different multi-cell cooperation areas are associated with mutually orthogonal muted resource elements.

17. A computer program product comprising a non-transitory computer-readable medium bearing computer program code embodied therein, where execution of the computer program code by at least one data processor results in performing operations comprising:
- transmitting signaling comprising information descriptive of a muted resource element pattern configuration to a user equipment operating in a cell that is associated with at least one multi-cell cooperation area;
- muting resource element transmissions in accordance with the information descriptive of the muted resource element pattern configuration; and
- receiving from the user equipment at least one measurement made according to the transmitted signaling for the at least one multi-cell cooperation area, where
- different multi-cell cooperation areas are associated with mutually orthogonal muted resource elements.

* * * * *